No. 686,511. Patented Nov. 12, 1901.
C. CROZIER.
MACHINE FOR CONVEYING AND LOADING CROPS OR MERCHANDISE.
(Application filed Aug. 20, 1901.)
(No Model.) 5 Sheets—Sheet 1.
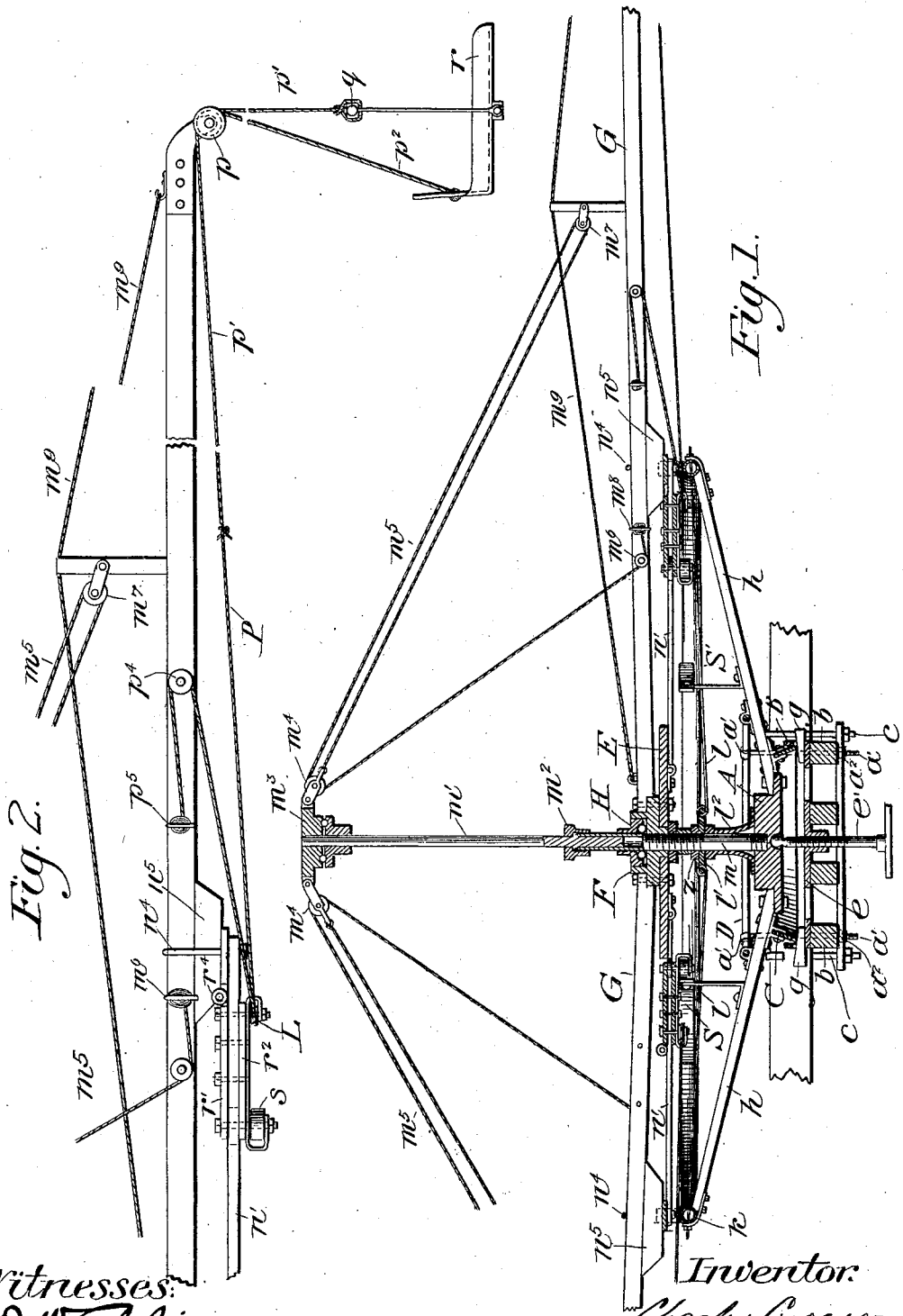
Witnesses:
D. W. Edelin.
M. L. Adams.
Inventor:
Charles Crozier,
by Pennie & Goldsborough,
Attys

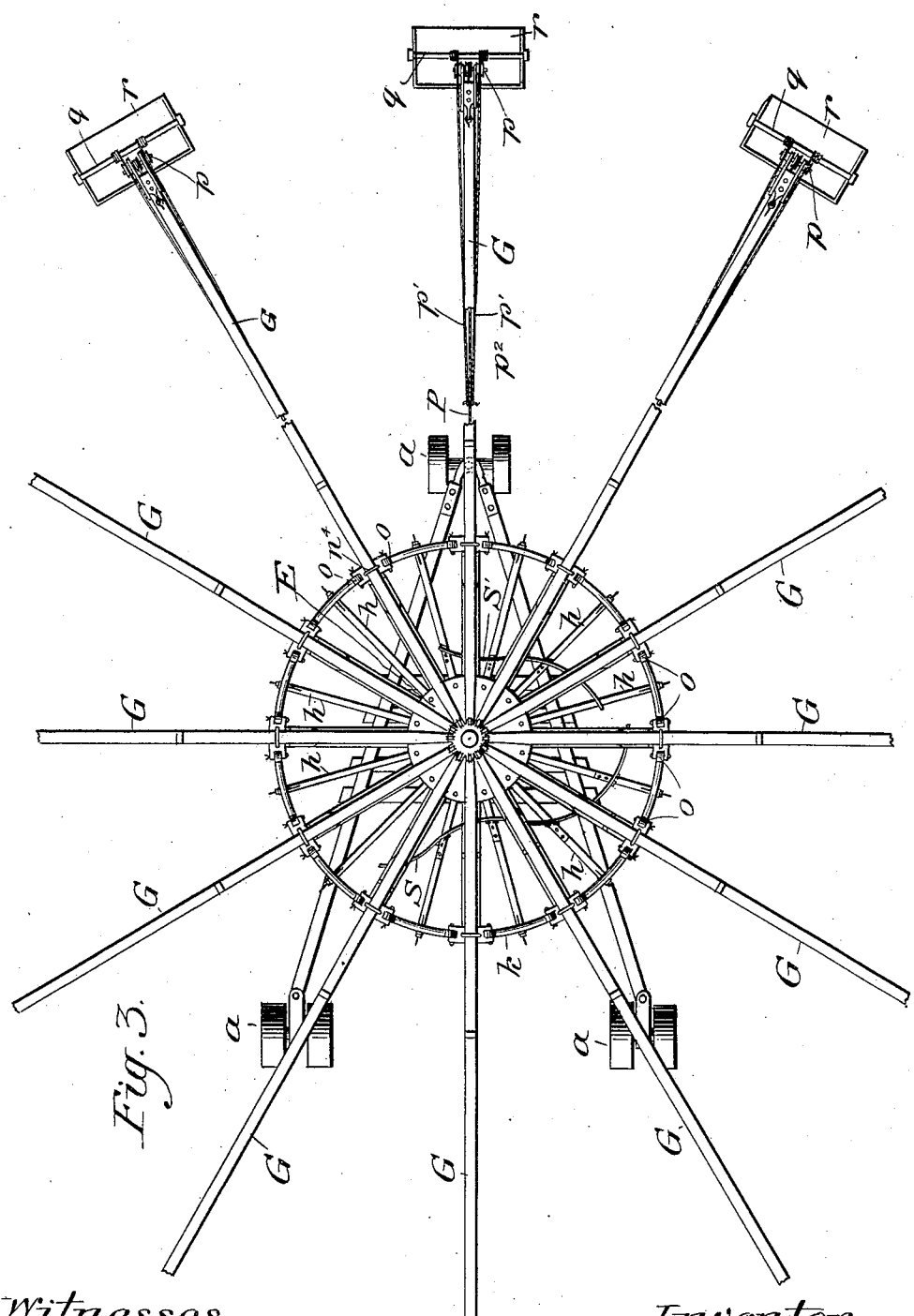

No. 686,511. Patented Nov. 12, 1901.
C. CROZIER.
MACHINE FOR CONVEYING AND LOADING CROPS OR MERCHANDISE.
(Application filed Aug. 20, 1901.)
(No Model.) 5 Sheets—Sheet 3.
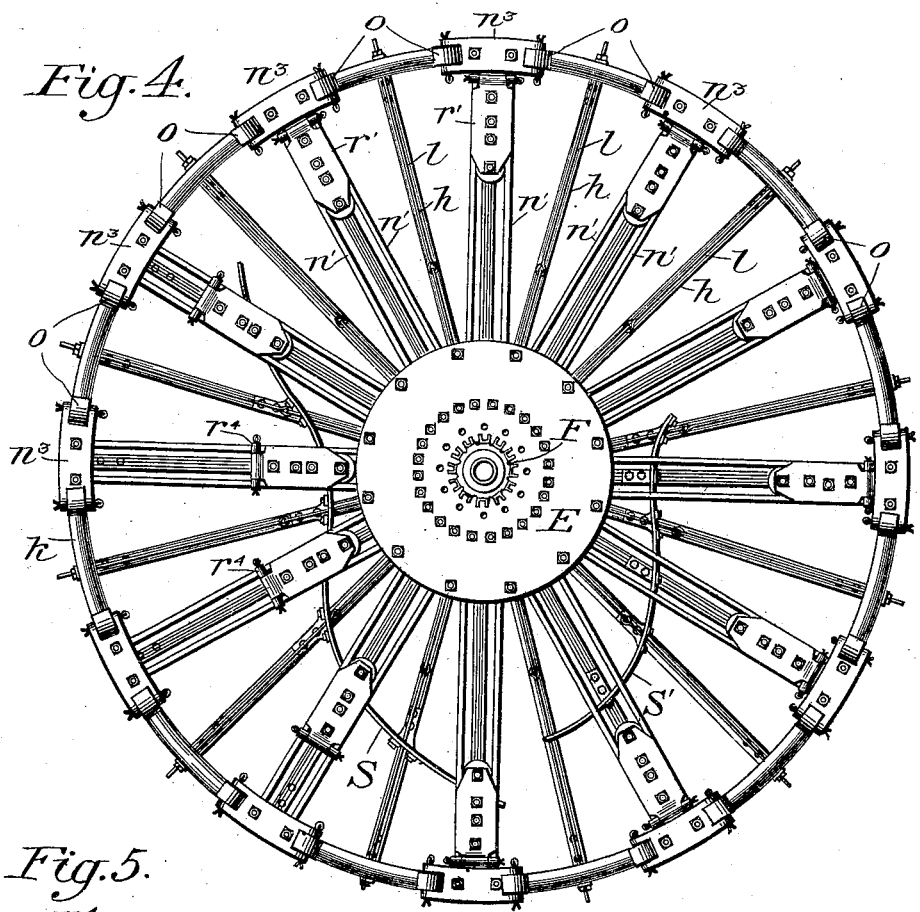
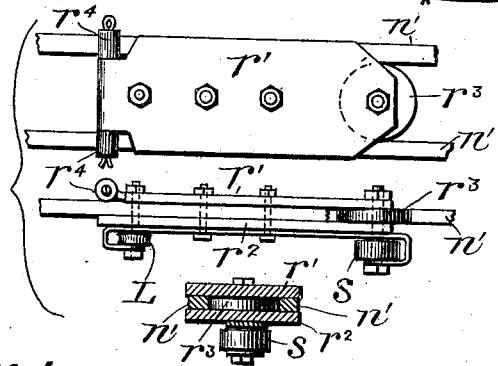
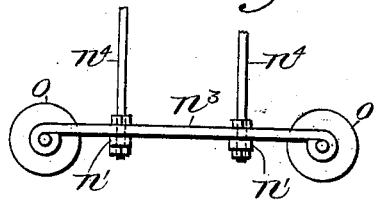
Witnesses:
D. W. Edelin.
M. L. Adams.
Inventor:
Charles Crozier,
by Pennie & Goldsborough,
Attys.

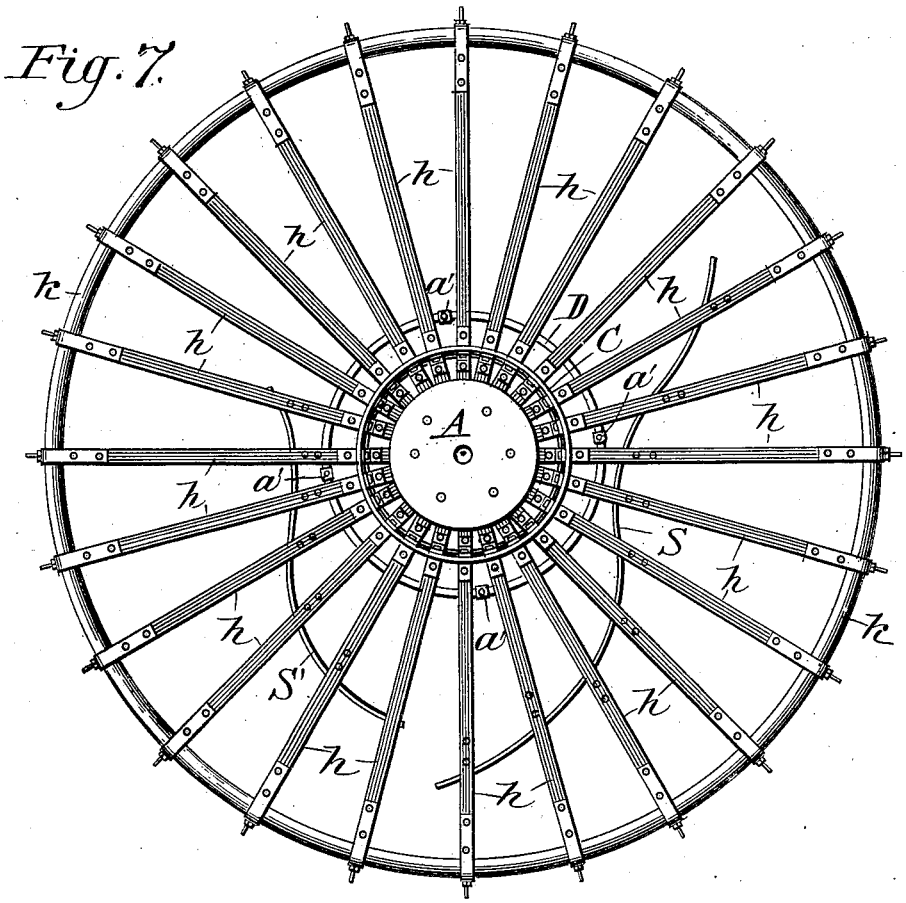
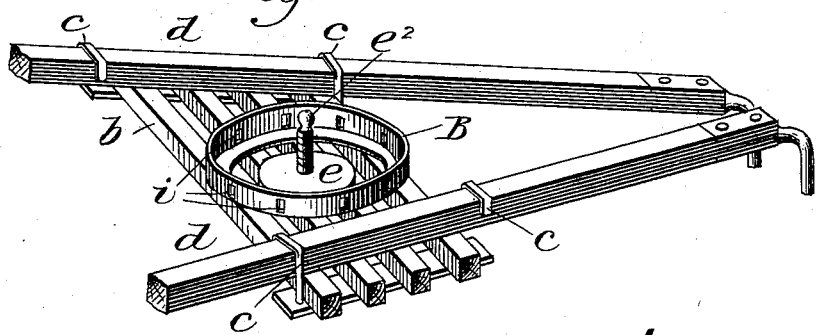

No. 686,511. Patented Nov. 12, 1901.
C. CROZIER.
MACHINE FOR CONVEYING AND LOADING CROPS OR MERCHANDISE.
(Application filed Aug. 20, 1901.)
(No Model.) 5 Sheets—Sheet 5.

Witnesses: Inventor:
Charles Crozier,

UNITED STATES PATENT OFFICE.

CHARLES CROZIER, OF HONOLULU, TERRITORY OF HAWAII.

MACHINE FOR CONVEYING AND LOADING CROPS OR MERCHANDISE.

SPECIFICATION forming part of Letters Patent No. 686,511, dated November 12, 1901.

Application filed August 20, 1901. Serial No. 72,676. (No model.)

*To all whom it may concern:*

Be it known that I, CHARLES CROZIER, a citizen of the United States, residing at Honolulu, Island of Oahu, Territory of Hawaii, have invented certain new and useful Improvements in Machines for Conveying and Loading; and I hereby declare the following to be a full, clear, and exact description of the invention, such as will enable others skilled in the art to which it appertains to make and use the same.

My invention is designed principally for use in sugar-cane fields, and is intended to receive the sugar-cane as it is cut by the laborers and convey it to a car located at the rear of the machine, the arrangement being such that the trays in which the cut cane is received and conveyed are automatically raised as they approach the car until they attain a level sufficient to clear the top of the car, whereupon their contents are dumped into the car itself. The receiving and conveying trays referred to are suspended by hanger-ropes from the outer ends of a series of booms, which extend radially from a tiltable table, whose angle of inclination can be varied by means of wedges or their equivalents, and which is adapted to be clamped in the position of adjustment chosen. In order to effect the automatic raising and lowering of the suspended trays, the suspending-ropes are placed under the control of reciprocating trolleys, whose positions are determined by cam tracks or guides appropriate to the purpose, as will hereinafter more fully appear.

Figure 9:
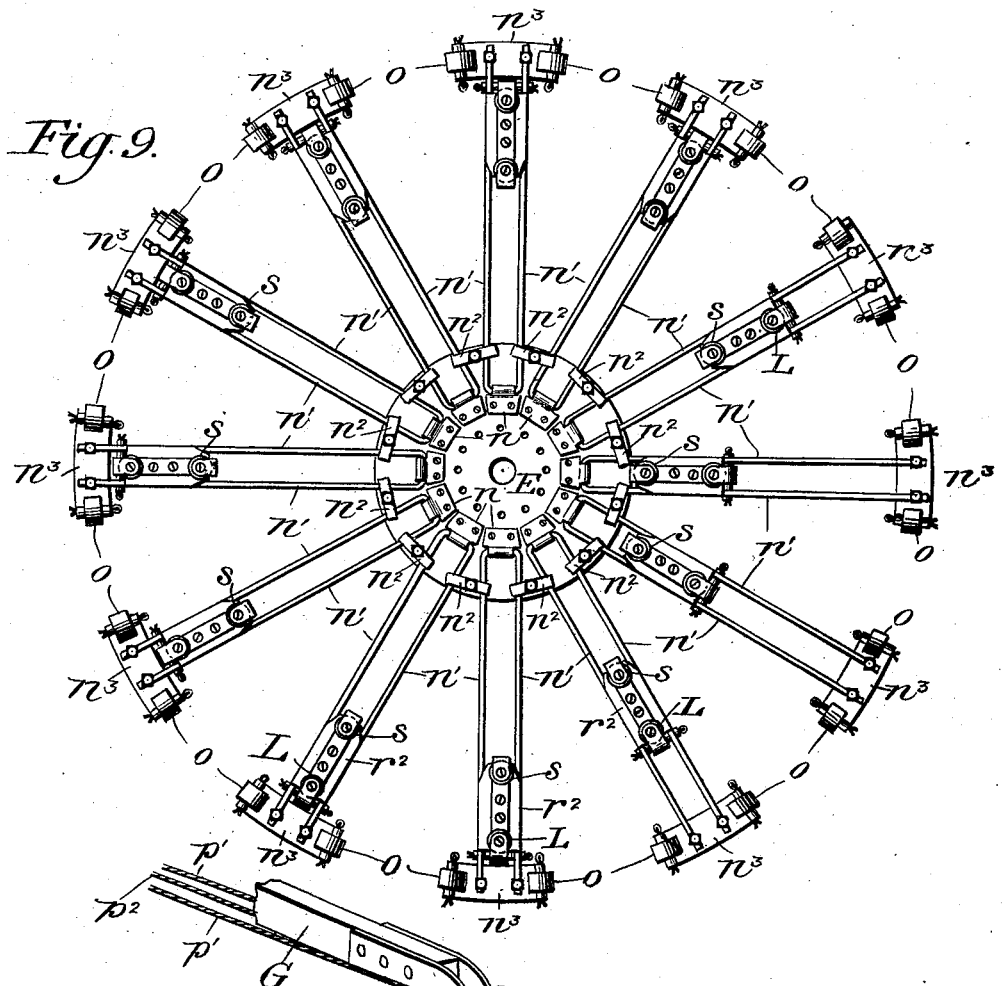
Figure 10:
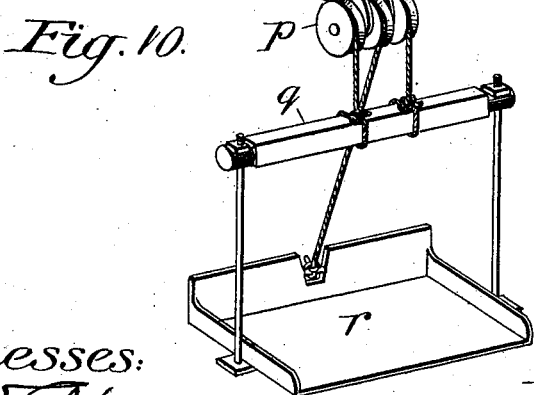

In the accompanying drawings, Figure 1 represents a vertical sectional view of the main body portion of an apparatus embodying my invention. Fig. 2 represents, on a slightly larger scale and partly broken away, one of the booms of the apparatus and its adjuncts. Fig. 3 represents a top plan view with the upper part of the mast removed, together with all of the trays but three. Fig. 4 represents, on a larger scale, a top plan view of the tiltable table and the rotatory boom-support. Fig. 5 represents, in top plan, side elevation, and cross-section, one of the suspending-rope-operating trolleys. Fig. 6 represents, in side elevation, one of the wheeled supports or bearers for the booms. Fig. 7 represents a bottom plan view of the tiltable table. Fig. 8 represents a perspective view of a portion of the wheeled base of the machine. Fig. 9 represents a bottom plan view of the rotatory boom-support. Fig. 10 represents in perspective a view of the outer end of one of the booms, together with the tray supported thereby.

Similar letters of reference indicate similar parts throughout the several views.

Referring to the drawings, it will be noted that the machine as a whole is adapted to be mounted upon a support having wheels, as $a$, adapted to be held in relative triangular position—as shown, for instance, in Fig. 3—by means of the distending bars $b$ and the hangers $c$ engaging the side beams $d$, which are pivoted in well-known manner to the axle upon which the front pair of wheels is mounted. The purpose of giving a wide triangular disposition to the wheeled support is to broaden the base, so that the machine may have sufficient stability in the field. In order to accommodate the wheeled support to travel along ordinary roads, the rear wheels of the support may be brought together to any desired degree by releasing the clamping-hangers $c$ and again clamping them in position after the side beams $d$ have been brought to the desired lesser angle of divergence. The wheeled support may be moved from place to place by horse-power or otherwise or may furnish its own power through the instrumentality of traction-gearing connected to one or more of the wheels, as is familiar to those versed in the art. It may also be provided with any suitable steering apparatus. In fact, in some instances I contemplate dispensing altogether with the triangular support and mounting the machine upon a car running upon a track.

Upon the table-beams $b$ is secured a metallic plate $e$, having a screw-threaded aperture through which extends the screw $e'$, having an operating-handle at its lower end and terminating at its upper end in a ball-shaped projection $e^2$, which is adapted to enter a similar socket in the center of the plate A. Encircling the plate $e$ is a ring B, secured to the table-beams $b$ and provided at intervals throughout its periphery with apertures $i$ for the reception of adjusting-wedges $g$. The purpose of the adjusting-wedges $g$ is to determine the angle of inclination of the tilting table constituting one of the main elements of the machine and of which the plate A constitutes a part. To this end the tilting table is provided with a downwardly-beveled supporting-ring C, adapted to extend within the ring B, as indicated in Fig. 1. The ring C is connected by suitable brackets to the radial spokes $h$, which spokes extend upward at an angle and are connected at their outer ends by means of a tube $k$, to which they are joined by connecting-straps or the like. From the tube $k$ extend inwardly the bracing-rods $l$, whose inner ends engage apertures in a plate $l'$, which rests upon a sleeve $l^2$, encircling the lower section $m$ of the mast and held in place by a nut $z'$.

Upon the tilting table and resting upon and secured to the inclined spokes $h$ is the clamping-ring D, provided at intervals with clamping-hangers $a'$, which extend downwardly and engage with the table-beams $b$, so that by means of nuts $a^2$ on the lower screw-threaded ends of said clamping-hangers the ring D, and consequently the tilting table, can be securely clamped to the wheel-support into whatever position of inclination it may have been previously brought. In order to tilt the table and clamp it in the tilted position, the clamps $a'$ are first released by backing of the nuts $a^2$, and the table as a whole is raised to the desired height by means of the screw $e'$. The wedges $g$ are then adjusted, respectively, to a position appropriate to the desired inclination of the table, and the table is tilted until the ring C rests upon the wedges, the screw $e'$ being backed off until the ring C is firmly seated upon the adjusted wedges. The nuts $a^2$ of the clamping-hangers $a'$ are then screwed up tight, so as to firmly anchor the table in its tilted adjustment.

Upon the tiltable table rests the rotatory boom-support. (Shown separately in bottom plan view in Fig. 9.) It consists, primarily, of a central plate E, to whose under surface are secured a series of bearings $n$ for the inner ends of radially-extending guide-rails $n'$, which are held in radial position by the turn-buttons $n^2$. As shown in detail in Fig. 6, the outer ends of the guides $n'$ are connected to plates $n^3$ by means of the U-shaped strap $n^4$, which is adapted to encircle the supporting-saddle $n^5$ of the boom, as indicated in Figs. 1 and 3. The opposite ends of the plate $n^3$ contain the antifriction-rollers $o$, as shown, which antifriction-rollers are adapted to travel upon the track $k$. The lower section $m$ of the mast is hollow and receives in its hollow interior the upper section $m'$, which is secured thereto by means of the nut $m^2$ or otherwise, so as to constitute with the lower portion a fixed or stationary support. Within the plate E is fixed the cup F, having a series of exterior pockets, as clearly shown in Fig. 4, within which pockets rest the inner ends of the booms G, the booms being further secured in place by means of bolts and nuts passing through the plate E. When the trays are loaded, the outer end of the booms naturally lower a little, and if the antifriction-rollers $o$ are upon the track $k$ the inner ends of the booms tend to rise correspondingly, thereby raising the plate E. To take up this upward thrust, a ball-bearing is provided consisting of the cup F, just referred to, and a cone-nut H, screwed to the mast-section $m'$, between which nut and cup the balls are inserted. By this expedient the friction is reduced, so that the structure may be readily revolved by hand, it being of course understood that the screw-threaded periphery of the lower section $m$ passes through an unthreaded aperture of the cup F.

At the upper part of the mast $m'$ upon ball-bearings, as shown, is mounted a cap $m^3$, which supports a series of pivoted sheaves $m^4$. A wire rope $m^5$, passing over pulleys $m^6$ and $m^7$, is adapted to be secured at one end to a securing-cleat $m^8$, whereby the booms G are supported intermediate of their length from the mast-head. To further stiffen the booms against flexure, they are provided with bob-stays $m^9$, as shown.

At the outer end of each boom are mounted pulleys $p$. (See Figs. 2, 3, and 10.) The two outer pulleys support the tray-suspending ropes $p'$, which ropes are connected to the supporting-bail $q$ of the tray. The central pulley supports the rope $p^2$, which is connected to the rear portion of the tray proper, $r$. The three ropes or cords $p'$ $p^2$, as indicated in Fig. 3, are joined about midway of the boom, so as to form a single rope P, which passes inwardly over the sheave L, mounted in a trolley, and thence is carried over a roller $p^4$ to a cleat $p^5$ upon the boom. The position of the trolley within which the pulley L is mounted determines the elevation of the tray. As shown more fully in Fig. 5, the trolley may conveniently consist of an upper plate $r'$ and a lower plate $r^2$, bolted together, as shown, and having antifriction-rollers $r^3$ and $r^4$ to insure its ready travel upon the guides $n'$. On its under side it carries the pulley L, just referred to, and also the roller $s$. Upon the stationary tiltable table are fixed the cam-tracks S S', adapted to engage the rollers $s$, as indicated in Fig. 4, the cam-tracks being so disposed with relation to the trolleys that as the booms revolve the corresponding trolleys will first move inwardly as the booms approach the car into which the cane is to be loaded, thereby causing a corresponding pull upon the rope P and a consequent elevation of the trays until as they reach the car they are brought to a height sufficient to clear the top thereof, whereupon the attendant pulls the middle rope $p^2$ and dumps the tray. The continued revolution of the dumped tray is accompanied by an outward movement of the trolley and a consequent gradual lowering of the tray to the proper level to be once more filled by the cutters.

The mode of operation of the apparatus will be apparent. After the tilting table has been adjusted to the desired angle of inclination and clamped in said adjustment the booms are caused to revolve by hand about the mast, and as they pass the cutters the trays are supplied with the cut sugar-cane, the booms and trays revolving slowly and the men who cut the cane being arranged in a semicircle in front of the machine, the machine following the men as they cut. It will be found convenient to establish a portable railway along a line parallel to that in which the machine is moving, so that as the trays revolve they will move in succession over a car or cars movable along said railway, the trays, as described, automatically rising from the level where the cutters are at work to a height sufficient to clear the top of the car or cars as they approach the latter and after dumping being gradually returned to their former level.

In practice it is contemplated to make the booms about forty feet or more in length, so that the machine will clean up a strip about one hundred feet wide on one side of the railway and parallel thereto and returning on the other side of the railway will clean up another strip one hundred feet wide, whereupon the track of the portable railway will be moved. It is also contemplated in practice to have the traction-wheels of the machine very large—the front wheel, for instance, about five feet in diameter and the rear wheels about six feet in diameter.

The entire operation of the apparatus is under the supervision of a single attendant, who causes the booms and trays to revolve while the cutters place the cane in the trays.

Having thus fully described my invention, what I claim as new, and desire to secure by Letters Patent, is—

1. A machine for conveying and loading crops and the like, comprising a series of traveling booms, having a common axis of rotation, trays suspended from the booms, and a tiltable support upon which the booms travel; substantially as described.

2. A machine for conveying and loading crops and the like, comprising a series of traveling booms having a common axis of rotation, trays suspended from the booms, and means for automatically elevating the trays with respect to the booms at predetermined intervals and for again returning them to their lower position; substantially as described.

3. A machine for conveying and loading crops and the like, comprising a series of traveling booms having a common axis of rotation, trays suspended from the booms, and means, including trolleys movable on the booms, for automatically elevating the trays at predetermined intervals and for again returning them to their lower position; substantially as described.

4. A machine for conveying and loading crops and the like, comprising a series of traveling booms having a common axis of rotation, trays suspended from the booms, and means for automatically elevating the trays at predetermined intervals and for again returning them to their lower position, said means consisting of trolleys engaging with fixed cam-tracks and also engaging the tray-suspending ropes; substantially as described.

5. In a machine of the kind described, a tiltable support for the conveyers, provided with a base-ring, adjustable wedges upon which said base-ring is adapted to rest, a subjacent support, and means for clamping the tiltable support to the subjacent support after it has been brought into the position of inclination desired; substantially as described.

6. In a machine of the kind described, a tiltable support for the conveyers, provided with a base-ring, adjustable wedges upon which said base-ring is adapted to rest, a subjacent support, and means for clamping the tiltable support to the subjacent support after it has been brought into the position of inclination desired, said clamping means consisting of a ring secured to the tiltable support, together with clamping-bolts depending from the ring and engaging the subjacent supports; substantially as described.

7. In a machine of the kind described, a tiltable support for the conveyers, provided with a base-ring, adjustable wedges upon which said base-ring is adapted to rest, a lifting-screw for raising the tiltable support from the wedges while the latter are being adjusted and for thereafter lowering it upon the wedges, a subjacent support, and means for clamping the tiltable support to the subjacent support after it has been brought into the position of inclination desired; substantially as described.

8. In a machine of the kind described, a tiltable support for the conveyers whose main body portion is made up of a lower central plate, bars extending upwardly and outwardly from said plate and connected at their outer ends by a track-rim, a central mast, an upper plate, and radial stay-rods connecting the said upper plate with the track-rim; substantially as described.

9. In a machine of the kind described, a tiltable support for the conveyers whose main body portion is made up of a lower central plate, bars extending upwardly and outwardly from said plate and connected at their outer ends by a track-rim, a central mast, an upper plate, radial stay-rods connecting the said upper plate with the track-rim, and cam-tracks supported from the upwardly and outwardly extending bars; substantially as described.

10. In a machine of the kind described, a series of traveling booms supported intermediate of their length upon a trackway, a central bearing within which the inner ends of the booms are secured, said bearing containing a cup, a stationary mast upon which said central bearing turns, a cone-nut fixed upon the mast, and balls between the cup and cone; substantially as described.

11. In a machine of the kind described, a series of traveling booms, a central mast about which said booms revolve, a rotary sleeve at the top of the mast, supported upon ball-bearings, and provided with a series of sheaves corresponding in number to the booms, bob-stays for the booms, and ropes extending from the frames of the sheaves to pulleys upon the steps of the bob-stays, and thence back over the sheaves and downwardly to cleats upon the booms; substantially as described.

12. In a machine of the kind described, a series of traveling booms, having a common axis of rotation, and trays suspended from the booms, said trays being provided with a dumping cord or rope, the said suspending-ropes and dumping-rope merging into a rope common to them all, whereby they all remain taut during the raising and lowering of the trays; substantially as described.

13. In a machine of the kind described, a series of traveling booms having a common axis of rotation, trays suspended from the booms, trolleys for automatically operating the suspending cords or ropes of the trays, said trolleys having pulleys, and the said suspending-cords passing around said pulleys and back again to cleats upon the booms; substantially as described.

14. In a machine of the kind described, a trolley for operating the suspending-rope of the trays, consisting of a main body portion, having at one end a pulley, and at the other end a roller, in combination with a cam-track with which the latter roller engages, and guide-tracks upon which the trolley moves; substantially as described.

15. In a machine of the kind described, a trolley for operating the suspending-rope of the trays, consisting of an upper plate, a lower plate, a pulley and a roller on the lower plate, and antifriction-rollers; substantially as described.

16. In a machine of the kind described, a midway support or saddle for the several booms, consisting of a plate, having supporting-wheels at its opposite ends, and a loop extending upwardly from said plate and encircling the boom; substantially as described.

17. In a machine of the kind described, a subjacent wheeled support, having side beams mounted at their forward ends upon a front pair of wheels, and supported at their opposite ends upon other wheels, intermediate cross-beams for distending the side beams to form an angle of greater or less degree, and clamping devices for locking them in the adjustment chosen; substantially as described.

In testimony whereof I have signed my name to this specification in the presence of two subscribing witnesses.

CHARLES CROZIER.

Witnesses:
ROBT. J. PRATT,
A. LEWIS, Jr.